United States Patent [19]

Kanemitsu

[11] Patent Number: 4,799,909
[45] Date of Patent: Jan. 24, 1989

[54] SHEET METAL POLY-V PULLEY AND MANUFACTURING METHOD THEREOF

[75] Inventor: Masahiro Kanemitsu, Kobe, Japan

[73] Assignee: Kabushiki Kaisha Kanemitsu, Japan

[21] Appl. No.: 63,236

[22] Filed: Jun. 17, 1987

[51] Int. Cl.⁴ .............................................. F16H 55/49
[52] U.S. Cl. ........................................ 474/168; 72/82; 474/170
[58] Field of Search ........................... 474/168–170, 474/174; 72/68, 83, 84, 82; 29/159 R, 159.2, 159.3

[56] References Cited

U.S. PATENT DOCUMENTS

| | | | |
|---|---|---|---|
| D. 266,982 | 11/1982 | Kanemitsu | D8/360 |
| D. 266,983 | 11/1982 | Kanemitsu | D8/360 |
| D. 266,984 | 11/1982 | Kanemitsu | D8/360 |
| D. 267,472 | 1/1983 | Kanemitsu | D8/360 |
| D. 267,540 | 1/1983 | Kanemitsu | D8/360 |
| D. 267,541 | 1/1983 | Kanemitsu | D8/360 |
| D. 268,092 | 3/1983 | Kanemitsu | D8/360 |
| D. 275,176 | 8/1984 | Kanemitsu | D8/360 |
| D. 275,365 | 9/1984 | Kanemitsu | D8/360 |
| D. 276,409 | 1/1984 | Kanemitsu | D8/360 |
| D. 277,547 | 2/1985 | Kanemitsu | D8/360 |
| 2,139,833 | 12/1938 | Le Jeune et al. | 29/159.1 |
| 2,471,906 | 5/1949 | Smith | 474/170 |
| 2,656,730 | 10/1953 | Mitchell | 29/159 R |
| 2,787,914 | 4/1957 | Nelson | 474/168 |
| 2,878,551 | 3/1959 | Woodward | 29/159.1 |
| 3,368,376 | 2/1968 | Previte | 72/82 |
| 3,457,751 | 7/1969 | Lindeman | 72/105 |
| 3,722,309 | 3/1973 | Shaffer | 474/169 |
| 3,772,928 | 11/1973 | Gobeille | 74/230.7 |
| 3,822,457 | 7/1974 | Frost et al. | 29/159 R |
| 3,838,485 | 10/1974 | Oldford | 474/170 |
| 3,907,371 | 9/1975 | Leudi et al. | 29/159.1 |
| 3,945,102 | 3/1976 | Kotlar | 29/159 R |
| 3,953,995 | 5/1976 | Haswell et al. | 72/105 |
| 3,962,926 | 6/1976 | Kotlar | 474/168 |
| 3,977,264 | 8/1976 | Sproul | 29/159 R |
| 3,994,181 | 11/1976 | Sproul | 474/170 |
| 4,050,321 | 9/1977 | Kraft | 74/230.8 |
| 4,059,023 | 11/1977 | Sproul | 474/170 |
| 4,078,410 | 3/1978 | Lemmo | 72/82 |
| 4,080,704 | 3/1978 | Blakesley | 29/159 R |
| 4,083,215 | 4/1978 | Guetzlaff | 72/82 |
| 4,086,798 | 5/1978 | Lemmo | 72/82 |
| 4,197,756 | 4/1980 | Yaros | 74/230.3 |
| 4,273,547 | 6/1981 | Bytzek | 474/170 |
| 4,313,323 | 2/1982 | Kanemitsu | 72/84 |
| 4,455,853 | 6/1984 | Kanemitsu | 72/84 |
| 4,518,374 | 5/1985 | Kanemitsu | 474/170 |
| 4,524,595 | 6/1985 | Oda | 72/84 |
| 4,551,122 | 11/1985 | Kraft et al. | 474/170 |

FOREIGN PATENT DOCUMENTS

| | | | |
|---|---|---|---|
| 2822056 | 11/1979 | Fed. Rep. of Germany | 474/170 |
| 508176 | 1/1955 | Italy | 474/170 |
| 11260 | 5/1979 | Japan | 72/105 |
| 143863 | 11/1981 | Japan | 29/159 R |
| 90459 | 6/1982 | Japan | 29/159 R |
| 195351 | 12/1982 | Japan | 29/159 R |
| 128564 | 8/1983 | Japan | 29/159 R |
| 163538 | 9/1983 | Japan | 29/159 R |
| 13535 | 1/1984 | Japan | 29/159 R |
| 2135421 | 8/1984 | United Kingdom | 470/170 |

OTHER PUBLICATIONS

Advertistement Brochure entitled Carina Ed.
Semi Tool Brochure on Rinser/Dryers, (38320), 1983.

*Primary Examiner*—Thuy M. Bui
*Attorney, Agent, or Firm*—Steele, Gould & Fried

[57] ABSTRACT

A sheet metal poly-V pulley and a method of manufacturing the same, having a tubular peripheral wall integrally formed from the peripheral edge of bottom wall and having poly-V grooves formed in said peripheral wall at specified pitches, in which a bent part is formed in said bottom wall in an annular form concentric with the axial center of the peripheral wall and bulging out in a convex form toward the opening side of the peripheral wall. The load from the poly-V belt which may cause plastic deformation of the sheet metal poly-V pulley is absorbed by this bent part, so that the increase of material cost, difficulty in forming, and increase of weight due to increase of the thickness of the blank of sheet metal poly-V pulley in order to enhance the strength may be avoided.

3 Claims, 7 Drawing Sheets

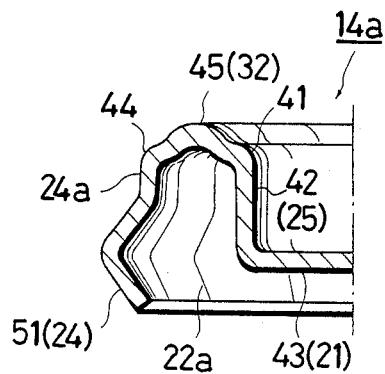
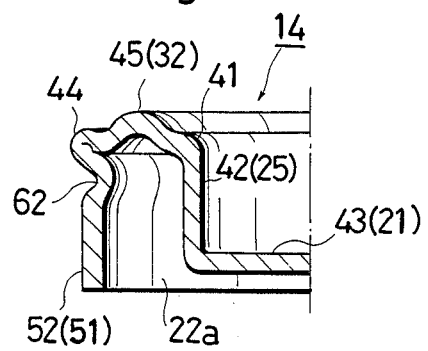
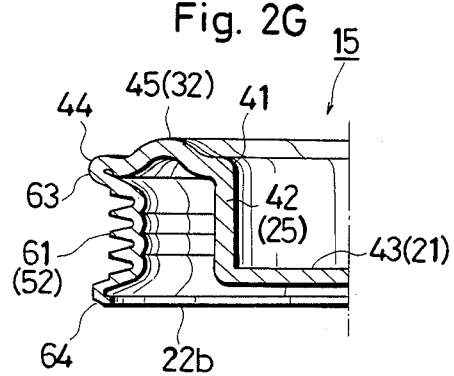
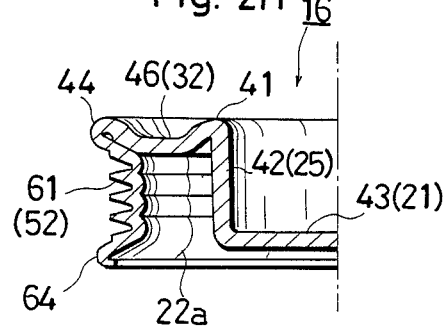
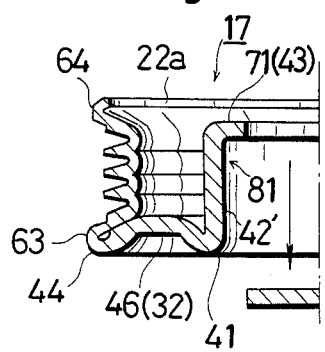
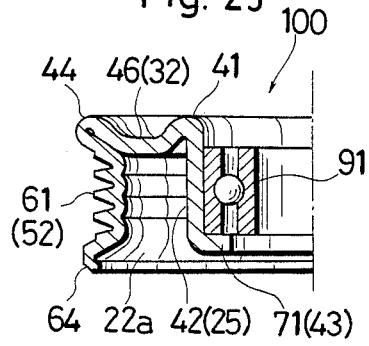

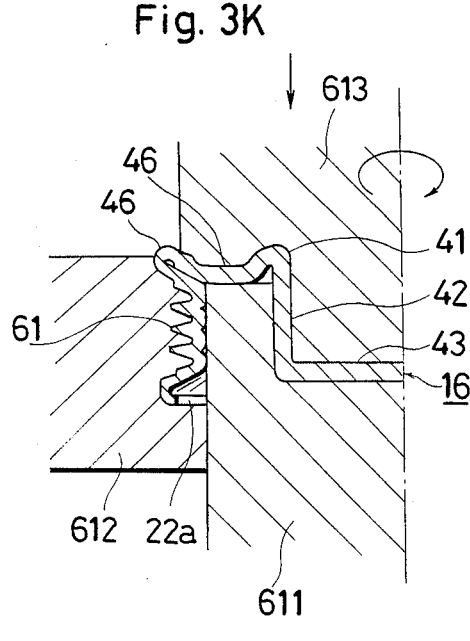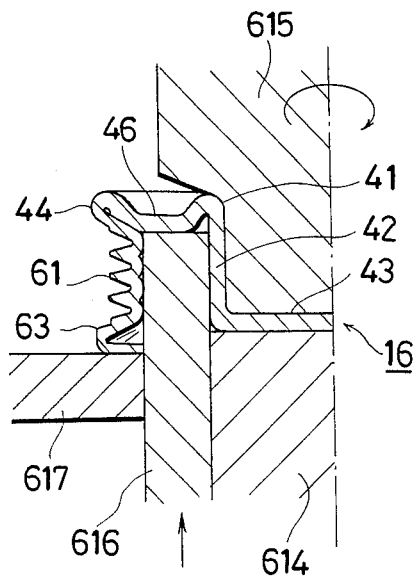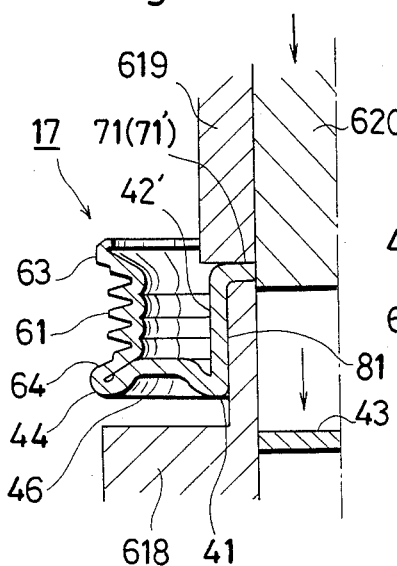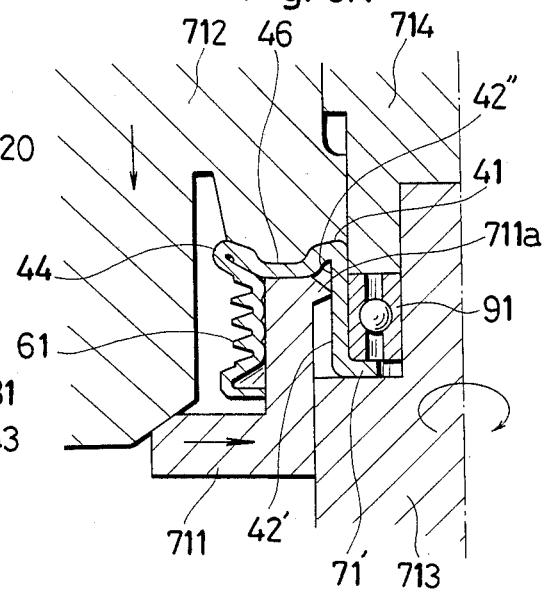

SHEET METAL POLY-V PULLEY AND MANUFACTURING METHOD THEREOF

BACKGROUND OF THE INVENTION

1. Field of the Invention:

This invention relates to a sheet metal poly-V pulley having poly-V grooves formed at specified pitches in the peripheral wall of a cup-shaped blank, and a manufacturing method thereof.

2. Prior Art:

Conventionally, sheet metal poly-V pulleys of this type, that is, sheet metal made poly-V pulleys having a plurality of V-grooves, or so-called poly-V grooves, formed at specified pitches on the peripheral wall of a cup-shaped blank possessing bottom wall and peripheral wall formed by deep drawing of sheet metal blank, have been merchandized, and used widely as intermediate conduction poly-V pulleys in, for example, vehicles engine appliances.

Incidentally, this kind of sheet metal poly-V pulley, unlike the cast product, is very light in weight because a thin sheet metal blank is drawn, rolled and processed, and the rotation transmission efficiency to the belt to wind around is very high, so that the rotation may be properly transmitted to the belt if rotated at high speed. Aside from such advantages, more recently, the strength of the poly-V belt to be wound around the sheet metal poly-V pulley is extremely improved, and thanks to the enhancement of strength of this poly-V belt, the poly-V belt is not broken if the sheet metal poly-V pulley is rotated at a considerably high speed. That is, in order to rotate the poly-V belt at high speed, it must be wound around and engaged with the sheet metal poly-V pulley at a very high tension, and if rotated by winding and engaging at such high tension, the poly-V belt is not broken in the present situation.

However, as stated above, when rotated in engagement by winding the poly-V belt around the sheet metal poly-V pulley at high tension, since the poly-V pulley is made of a thin sheet metal blank, plastic deformation is likely to occur in the peripheral wall and bottom wall, or crossing parts of bottom wall and peripheral wall, and it is sometimes difficult to strengthen the pulleys as the strength of poly-V belts increases.

In this case, to prevent deformation of the sheet metal poly-V pulley, it may be possible to cope with the enhancement of strength of poly-V belt by using a considerably thick sheet metal blank, but it may result in a large increase in the material cost or difficulty in forming to manufacture a sheet metal poly-V pulley from a thick sheet metal blank, and also increase in the weight, which may finally sacrifice the advantages of the sheet metal poly-V pulley.

SUMMARY OF THE INVENTION

This invention is devised in the light of such circumstances, and it is hence a primary object of this invention to present a sheet metal poly-V pulley capable of effectively preventing plastic deformation against pushing pressure from the poly-V belt without causing increase of material cost, trouble of forming, and increase of weight.

In order to achieve the above object, the sheet metal poly-V pulley of this invention has a bent part projecting in a convex form toward the opening side of peripheral wall formed, in an annular form concentric with the axial center of the peripheral wall, in the bottom wall of a cup-shaped blank.

In such construction, if a large pushing pressure should be applied in an arbitrary period from the poly-V belt engaged with the poly-V grooves of a rotating peripheral wall, this bent part works as a shock absorber to effectively absorb this pushing pressure by following it up, so that the plastic deformation in the peripheral part and bottom wall, or crossing parts of peripheral wall and bottom wall may be effectively prevented. What is more, since it is only enough to form a bent part projecting in a convex form toward the opening side of the peripheral wall in an annular form concentric with the peripheral wall, in the bottom wall, the structure is simple and the manufacture is easy, while the increase of weight and cost may be effectively prevented. The effects are absolute and outstanding.

It is another object of this invention to present a method of mass-producing favorably sheet metal poly-V pulleys having said bent part in the bottom wall.

The foregoing object is achieved by providing a method comprising at least steps of:

forming a cup-shaped blank by deep-drawing a sheet metal blank to form a cup-shaped blank made of a bottom part and a rough peripheral wall part;

forming a stepped part by forming an inclined stepped part in said rough peripheral wall part and dividing the rough peripheral wall part into a poly-V groove forming part at the opening edge side and a preliminary forming part at the bottom side;

forming a rough preliminary forming blank by reversely drawing said preliminary forming part and substrate part to fold back inward, forming an inner peripheral side fold-back projected part projecting outward between said inclined stepped part and said preliminary forming part, and forming a bearing part from the preliminary forming part and an inverted substrate part from the bottom part;

forming a bent part by further reversely drawing inward said bearing part and inverted substrate part to form again, and forming an outer peripheral side fold-back projected part projecting outward between said poly-V groove forming part and inclined stepped part, and moderately curving inward in concave form the inclined stepped part between inner and outer peripheral side foldback projected parts; and forming poly-V grooves having proper poly-V grooves formed in said poly-V groove forming part.

Other objects and features of this invention will become apparent in the course of the following description.

BRIEF DESCRIPTION OF THE DRAWINGS

FIGS. 2A to 2J partially cut-away sectional views showing principal manufacturing steps from the sheet metal blank to the product;

DETAILED DESCRIPTION OF THE PREFERRED EMBODIMENTS

Figure 1:
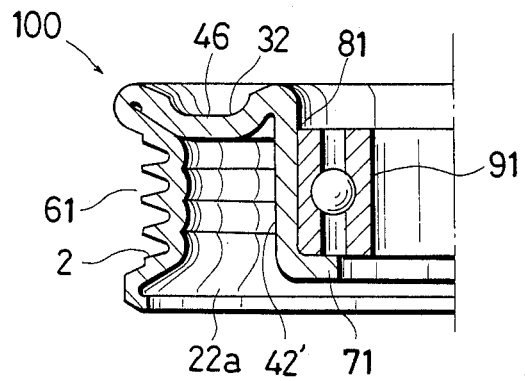
FIG. 1 is a partially cut-away sectional view of a sheet metal poly-V to this invention.

Referring now to FIG. 1, one of the embodiments of this invention is described below, in which numeral 1 is a sheet metal poly-V pulley possessing a bearing 91 and it has a tubular peripheral wall 2 integrally formed from the peripheral edge of a bottom wall 32, and poly-V grooves 61 are formed in said peripheral wall 2, while in the axial central part of the bottom wall 32, a bearing fitting part 81 integrally possessing a cylindrical part 42' projecting to the opening 22a side of the peripheral wall 2 and an annular flange 71 projecting inward from its end edge part is formed. A bearing 91 is press-fitted into said bearing fitting part 81, and the part of said cylindrical part 42' is crimped to the axial central side, so that said bearing 91 is planted in the bearing fitting part 81. A bent part 46 is formed in said bottom wall 32, a bent part 46 has a concave section projecting in a convex form toward the opening 22a side of the peripheral wall 2 in an annular form, concentric with the peripheral wall 2. The bent part 46 is used as a kind of shock absorber against the pushing pressure from the poly-V belt (not shown) which is engaged with the poly-V groves 61 of the peripheral wall 2.

An example of method of manufacturing the sheet metal poly-V pulley 1 possessing this bearing 91 is explained below while referring to FIG. 2 and FIG. 3.

FIGS. 2A to 2J are partially cut-away sectional views showing the principal manufacturing steps from the sheet metal blank to the product.

Figure 2A:
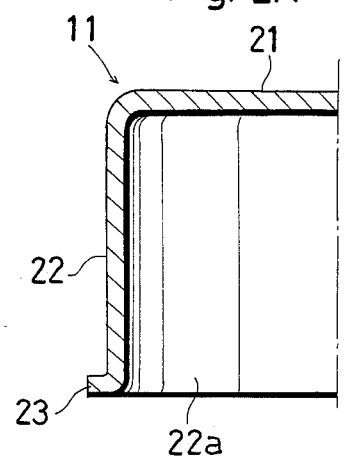
Figure 2B:
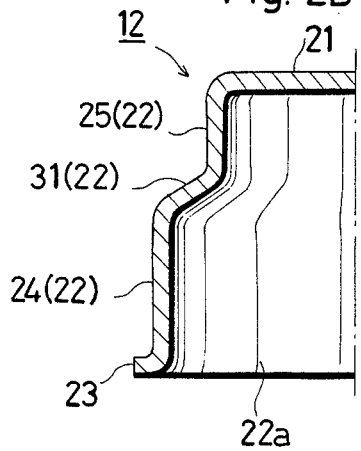
Figure 2C:
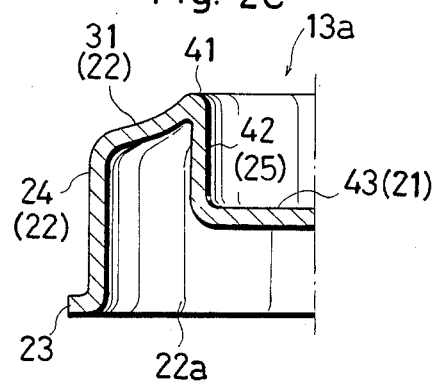
Figure 2D:
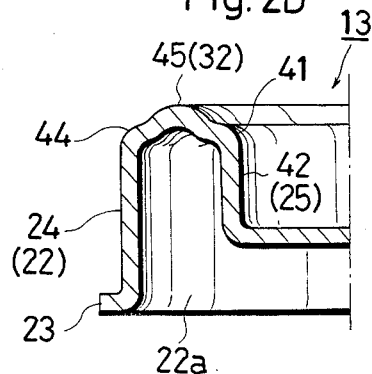

That is, in FIG. 2A, in the first place, a sheet metal blank of a specified thickness is deep-drawn, and a cup-shaped blank 11 consisting of a bottom part 21 and a rough peripheral wall part 22 having a flange 23 at the opening 22a side is formed;

in FIG. 2B, an inclined stepped part 31 is formed on the rough peripheral wall part 22 of said cup-shaped blank 11, and this rough peripheral wall part 22 is divided into a poly-V groove forming part 24 at the opening 22a side, and a preliminary forming part 25 at the bottom 21 side to obtain a stepped cup-shaped blank 12;

in FIG. 2C, the preliminary forming part 25 and bottom 21 side of said stepped cup-shaped blank 12 are reversely drawn and formed, and once folded back inward, and an inner peripheral side fold-back projected part 41 projecting outward is formed between said inclined stepped part 31 and preliminary forming part 25, and a rough preliminary forming blank 13a is obtained, using the preliminary forming part 25 as bearing supporting part 42 and the bottom part 21 as inverted substrate part 43;

in FIG. 2D, the bearing supporting part 42 and inverted substrate part 43 of said rough preliminary forming blank 13a are further drawn reversely inward to form again, and an outer peripheral side fold-back projected part 44 similarly projecting outward is formed between said V-groove forming part 24 and inclined stepped part 31, while the bottom wall part 32 between said bearing supporting part 42 and poly-V groove forming part 24 is drawn, and a convex projected part 45 projecting in curvature outward is formed;

in FIG. 2E, the flange 23 of the preliminary forming blank 13 obtained in the above preliminary forming blank forming step is cut off in a circle and removed, and at the poly-V groove forming part 24, with the end part 24a left over at said outer peripheral side fold-back projected part 44 side, a rough increased wall thickness forming blank 14a is obtained as an increased wall thickness peojected part 51 having said poly-V groove forming part 24a deflected outward by the portion corresponding to the increase of wall thickness;

in FIG. 2F, the increased wall thickness projected part 51 of said rough increased wall thickness forming blank 14a is flattened by pressure, and a poly-V groove forming part 52 increased in wall thickness corresponding to the degree of deflection is formed, and, at the same time, a reference groove part 62 for forming poly-V grooves is formed in part closer to said end part 24a, and an increased wall thickness forming blank 14 is obtained;

in FIG. 2G, with the molding reference point taken at said reference groove aprt 62, against the poly-V groove forming part 52 of said increased wall thickness forming blank 14, a poly-V grooved blank 15 forming a plurality of poly-V grooves 61 placed parallel to each other having rising lugs 63, 64 at both sides of said outer peripheral side fold-back projected part 44 and opening edge part 22b is obtained;

in FIG. 2H, said convex projected part 45 is drawn reversely inward, and a bent part 46 is formed in the bottom wall 32 by moderately curved and bulged in a concave form to the opening 22a side of the poly-V groove forming part 52 to obtain a bent part forming blank 16;

in FIG. 2I, the central part side of said inverted substrate 43 is cut off and removed, and a bearing fitting part 81 composed of cylindrical part 42' and annular flange 71 is formed, and a bearing forming blank 17 is obtained; and in FIG. 2J, a prefabricated bearing 91 is press-fitted into the cylindrical part 42' which makes up the bearing fitting part 81 of said bearing forming blank 17 until abutting against the flange 71, and is further crimped and fixed in place.

After these steps, a desired sheet metal poly-V pulley 100 is manufactured, which possesses poly-V grooves 61 in the peripheral wall, possesses a bent part 46 bulging out in a convex form toward the opening 22a side on the bottom wall 32, and has the bearing 91 planted on the axial center.

Figure 3A:
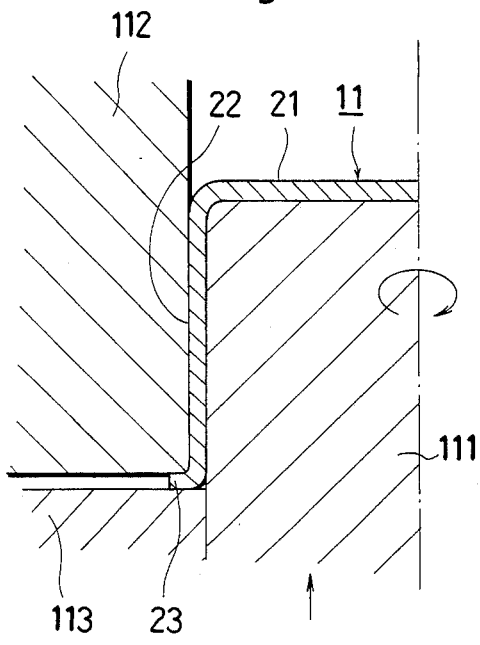
FIGS. 3A to 3N are partially cut-away sectional views showing further practical manufacturing steps of the method of manufacturing sheet metal poly-V pulley according to this invention.

FIGS. 3A to 3N are sectional explanatory drawings showing the further practical manufacturing steps of the same manufacturing method of said sheet metal poly-V pulley 100, and the details of each step are described below.

(1) Cup-shaped blank forming step (FIG. 2A):

In this cup-shaped blank forming step, as shown in FIG. 3A, a sheet metal blank of specified thickness and outside diameter is used as forming material, and it is deep-drawn into specified outside diameter and drawing depth by means of movable, fixed inner and outer drawing dies 111, 112, and holding die 113, and a cup-shaped blank 11 composed of bottom part 21 and rough peripheral wall part 22 is formed. At this time, at the opening edge of said rough peripheral wall part 22, a flange 34 due to excess material of drawing is left over.

Figure 3B:
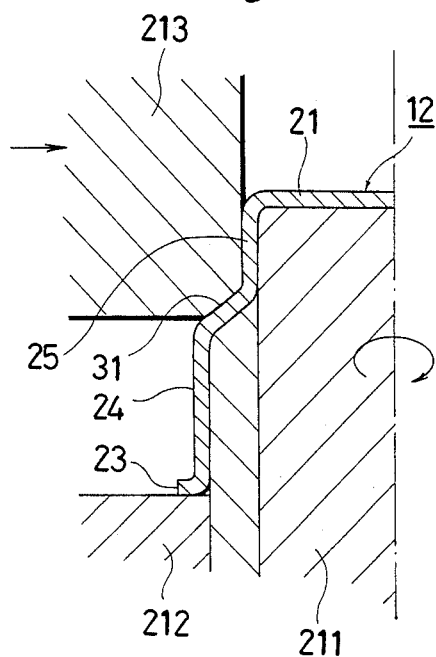

(2) Stepped part forming step (FIG. 2B):

In this stepped part forming step, as shown in FIG. 3B, said cup-shaped blank 11 is fitted and held in the mutually overlaid inner holding dies 211, 212, and the part of the rough peripheral wall 22 at the bottom 21 side of the cup-shaped blank 11 is preliminarily rolled by a preliminary stepping roller 213, and an inclined stepped part 31 is formed in this part, and a stepped cup-shaped blank 12 is obtained.

That is, in this step, substantially, by forming the inclined stepped part 31 in the rough peripheral wall 22 of the cup-shaped blank 11, this rough peripheral wall part 22 is divided by the inclined stepped part 31 into the poly-V groove forming part 24 at the opening 22a side with increased diameter, and the preliminary forming part 25 at the bottom 21 side with decreased diameter.

Figure 3C:
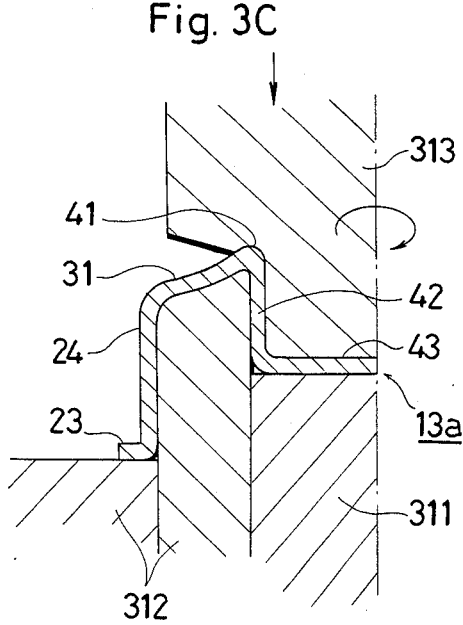

(3) Rough preliminary forming blank forming step (FIG. 2C):

In this rough preliminary forming blank forming step, as shown in FIG. 3C, said stepped cup-shaped blank 12 is fitted and held in the mutually overlaid inner holding dies 311, 312, and the preliminary forming part 25 and bottom part 21 of said stepped cup-shaped blank 12 are drawn reversely and formed into specified inside diameter and drawing depth by the inner drawing die 313, and are folded back inward, and an inner peripheral side fold-back projected part 41 projecting outward is formed between said inclined stepped part 31 and preliminary forming part 25, and a bearing supporting part 42 is formed from the preliminary forming part 25, and an inverted substrate part 43 from the substrate part 21.

In this step, finally, the inclined stepped part 31 and preliminary forming part 25 are formed in an acute angle in inverted state. In reverse drawing and forming in such a wide angle range, a strong internal stress occurs in the blank, but, in this step, since an inner peripheral side fold-back projected part 41 projecting outward is provided in this acute angle bent part, the generated internal stress is released smoothly because this part is bent at acute angle, and furthermore it can be concentrated into this fold-back projected part 41 which is composed as a kind of shock absorber, so that this forming may be done at higher precision and more easily.

Figure 3D:
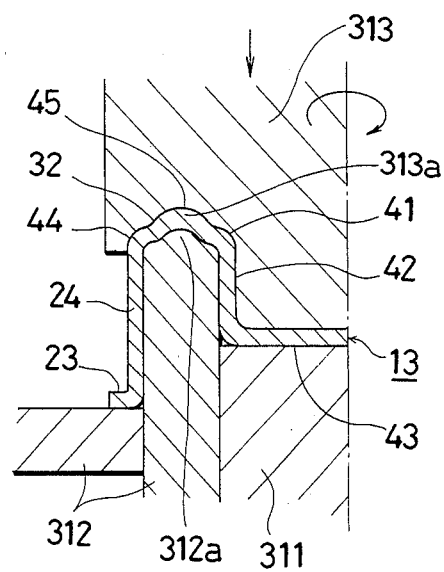

(4) Preliminary forming blank forming step (FIG. 2D):

In this preliminary forming blank forming step, by pressing down while rotating the inner drawing die 313 with said stepped cup-shaped blank 13a fitted and held between the inner holding die 312 having an annular protuberance 312a formed at said inclined stepped aprt 31 side and the inner drawing die 313 having an annular concave part 313a formed at said inclined stepped part 31 side, as shown in FIG. 3D, an outer peripheral side fold-back projected part 44 similarly projecting outward is formed between the poly-V groove forming part 24 and inclined stepped part 31, while a preliminary forming blank 13 is obtained by forming a convex projected part 45 in the bottom wall 32 between both fold-back projected parts 41, 44.

In this step, since the convex projected part 45 is formed together with the outer peripheral side fold-back projected part 41 in such a manner as to open again the inner peripheral side fold-back projected part 41 once drawn into an acute angle in the preceding step, the internal residual stress concentrated in the inner peripheral side fold-back projected part 41 is moderately dispersed and released among the convex projected part 45 and fold-back projected part 44, and the fitting of the forming parts is improved, so that there is no risk of impeding the high precision forming.

Figure 3E:
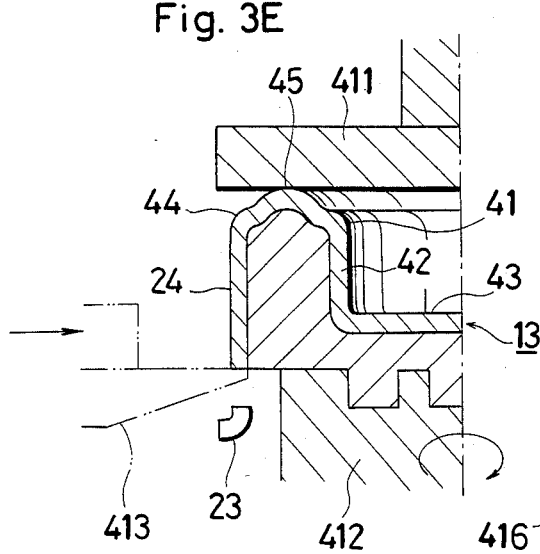
Figure 3F:
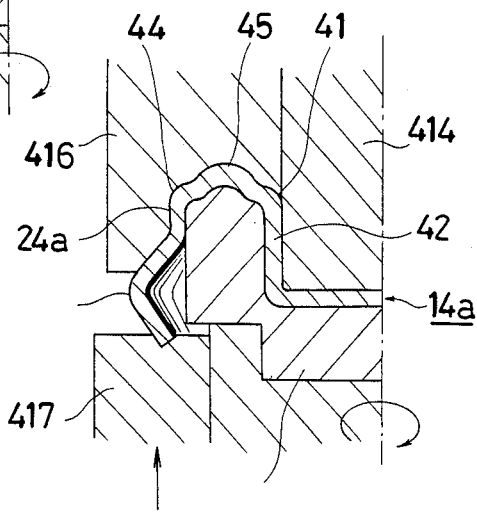

(5) Increased wall thickness preliminary forming step (FIG. 2E):

In this increased wall thickness preliminary forming step, first as shown in FIG. 3E, said preliminary forming blank 13 is held from both inside and outside by the outer holding die 411 and inner holding die 412 which runs along the contour of the inside of the preliminary forming blank 13, and said poly-V groove forming part 24 is cut from specified position by a shearing roller 413, and the flange 23 and excess material are removed in advance to shape neatly, and then, as shown in FIG. 3F, the blank is concentrically fitted and held by the inner and outer holding dies 414, 415, 416, while the end part 24a is tightly held by the inner and outer holding dies 415, 416 along the inner and outer shape of the preliminary forming blank 13, and the poly-V groove forming part 24 is deflected outward to the outer peripheral side by the portion corresponding to the increase of wall thickness stated below, by means of outer drawing and forming die 417, and an increased wall thickness projected part 51 is formed, and a rough increased wall thickness forming blank 14a is obtained.

Figure 3G:
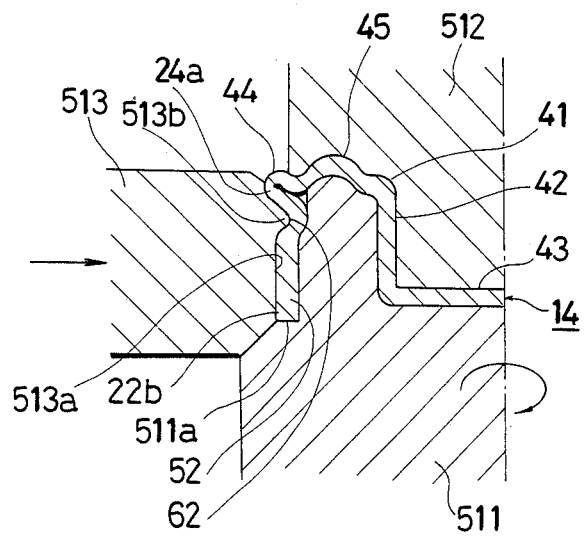

(6) Increased wall thickness forming step (FIG. 2F):

In this increased wall thickness forming step, first as shown in FIG. 3G, said rough increased wall thickness forming blank 14a is held in a preliminary forming die 511, and the convex projected part 45 of said blank 14a, inner peripheral side fold-back projected part 41, bearing supporting part 42, and inverted substrate part 43 are concentrically held from outside by an outer holding die 512, while said increased wall thickness projected part 51 is supported by abutting its opening edge, that is, said opening edge 22b against the abutting stepped part 511a of the preliminary forming die 511.

In this state, by means of the poly-V groove preliminary forming roller 513 which also functions as wall thickness increasing roller, the bulging end part of the increased wall thickness projected part 51 is pressed, but since the opening edge 22b of the increased wall thickness projected part 51 is supported by abutting against the abutting stepped part 511a, this increased wall thickness projected part 51 is gradually rolled and flattened by pressure by the roller surface 513a of this roller 513 to be formed in plastic fluidity so that an increase to specified wall thickness is attached in this part. At the same time, by the protruding forming plane 513b of this roller 513, the end part 24a brought closer to the increased wall thickness projected aprt 51, and also the outer peripheral side fold-back projected part 44 of the poly-V groove forming part 52 increased in wall thickness is drawn from the outer periphery to be rolled preliminarily, and a reference groove part 62 serving as the forming standard point is preliminarily formed in this part for poly-V groove forming, so that the increased wall thickness forming blank 14 is obtained.

In this case, rolling forming for increasing the wall thickness of poly-V groove forming part 52, and the simultaneous rolling forming of reference groove part 62 have the internal stress absorbed effectively by the presence of the outer peripheral fold-back projected part 44, so that the effect of this stress is not applied to other forming parts.

Figure 3H:
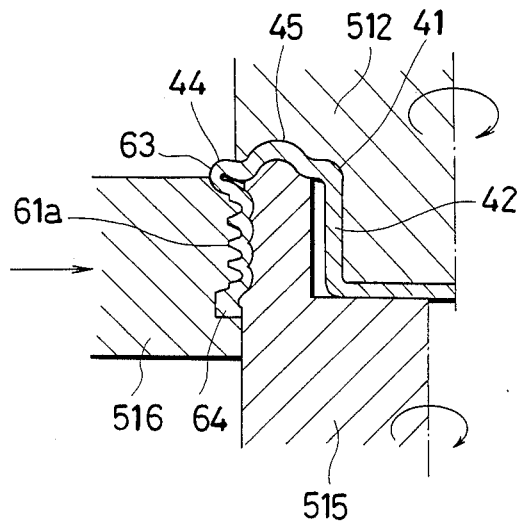
Figure 3I:
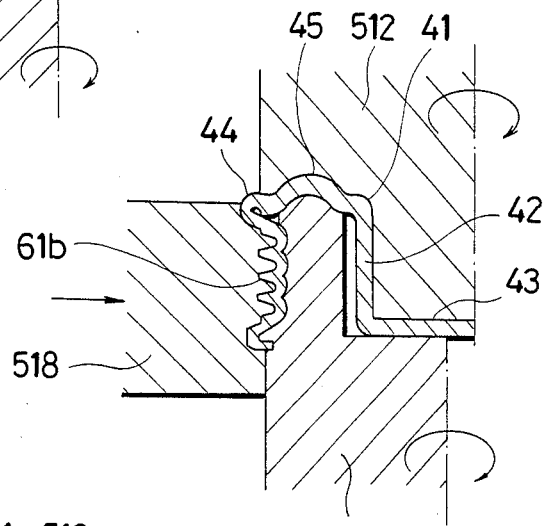

(7) Poly-V groove forming step (FIG. 2G):

In this poly-V groove forming step, first as shown in FIGS. 3H and 3I, in combining said preliminary forming die 511 and forming roller 513, it is sequentially replaced by the combination of the deviated first and second poly-V groove preliminary forming dies 515, 517 and forming rollers 516, 518, and while keeping the same holding state as above, said reference groove part 62 is used as one forming reference point for poly-V groove forming, and for this poly-V groove forming part 52 a plurality of preliminary poly-V grooves 61a, 61b placed parallel, as first and second preliminary rollings, are drawn in gradually, while rising lugs 63, 64 are formed to stand up gradually at the outer peripheral side fold-back projected part 44 side and opening edge 22b side.

That is, with respect to the poly-V groove forming part 52 increased in wall thickness, the reference groove part 62 serves as the forming reference point for poly-V groove forming, and, same as stated above, by the presence of the outer peripheral side fold-back projected part 44, the internal stress is effectively absorbed, and a plurality of preliminary poly-V grooves 61a, 61b as first and second preliminary rollings respectively are formed parallel easily and in accurate dimensional configuration in a sufficient wall thickness neither too less nor too much.

Figure 3J:
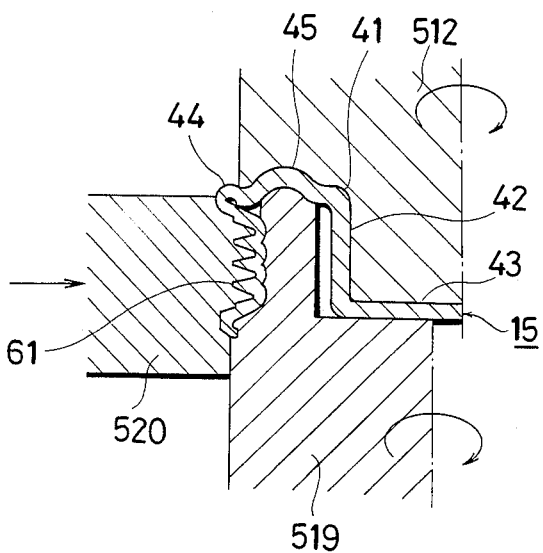

Afterwards, as shown in FIG. 3J, the combination of poly-V groove forming die and forming roller is replaced by the combination of deviated poly-V groove finishing forming die 519 and poly-V groove finishing forming roller 520, and here keeping the same holding state as above, too, a plurality of preliminary poly-V grooves 61b set parallel in said second preliminary rolling are drawn deep, finished and roller from outer periphery by the V-groove finishing forming roller 520, and the parallel plurality of poly-V grooves 61 are formed at high precision with respect to the poly-V groove forming part 52, so that a poly-V groove blank 15 is obtained.

Here, too, in preliminary rolling of this poly-V grooves 61 and finish-rolling, delicate actions of the internal stress are effectively absorbed by the outer peripheral fold-back projected part 44 and the convex projected part 45 bulging outside in contact with this part, and effects of forming stress and residual stress may not be applied to other forming parts.

(8) Bent part forming step (FIG. 2H):

In this bent part forming step, said poly-V grooved blank 15 is held in the inner holding die 611 as shown in FIG. 3K, and the poly-V grooves 61 of this blank 15 are held from outside by the holding die 612.

While rotating the reverse drawing roller 613, said convex projected part 45 is drawn reversely, and a bent part 46 having the convex projected part 45 bulging out to the opening 22a side is formed, and a bent part forming blank 16 is obtained.

In this step, too, when forming the bent part 46, delicate actions of the internal stress are effectively absorbed by the inner peripheral side fold-back projected part 41 and outer peripheral side fold-back projected part 44, so that effects of forming stress or residual stress may not be applied to other forming parts.

(9) Bearing part forming step (FIG. 2I):

In this bearing part forming step, first as shown in FIG. 3L, said bent part forming member 16 is firmly held, same as above, by the inner holding dies 614, 615, and outer holding die 616, and the bearing support part 41 of the bent part forming blank 16 is once shaped again by the shaping roll 617, and the dimensions and precision are corrected.

In this case, too, the internal stress applied at the time of shaping may be favorably absorbed by the inner peripheral side fold-back projected part 41 and bent part 46.

Next, as shown in FIG. 3M, the peripheral part 71 of the inverted substrate 43 communicating with the bent part 46 of said bent part forming blank 16 is firmly held by other inner holding die 618 and outer holding die 619, and the central side of this inverted substrate part 43 is cut off and removed, leaving only the part of the peripheral part 71 by means of shearing die 620, thereby forming a bearing fitting part 81 composed of cylindrical part 42 and annular flange part 71, so that a bearing forming member 17 is obtained.

(10) Bearing press-fitting, crimping step (FIG. 2J):

In this bearing press-fitting, crimping step, first as shown in FIG. 3N, the bent part 46 of said bearing forming member 17 is similarly held firmly as above by means of inner holding die 711 and outer holding die 712, and the outer base part of the cylindrical part 42' is held by the protruding end 711a of the inner holding die 711, and the annular flange part 71 by the inner holding die 713. In this state, using a push-in die 714, a prefabricated bearing 91 is press-fitted into the cylindrical part 42' to make up the bearing fitting part 81 until abutting against the flange part 71, while the outer upper part 42'' of the cylindrical part 42' is crimped to set in place.

In this bearing press-fitting and crimping step, the outer base part of the cylindrical part 42' is stopped by the protruding end 711a of the inner holding die 711, and the flange part 71 is received by the inner holding die 13, so that press-fitting and crimping of the prefabricated bearing 91 may be very smooth and easy.

In this way, as intended by this embodiment, a sheet metal poly-V pulley 100 having poly-V grooves 71 in the peripheral wall 2, and having a bent part 46 which is annular and bulging out in convex form to the opening 22a side of the peripheral part, in the bottom wall 32, and also having a bearing 91 planted in the axial central part of the bottom wall 32 may be composed at high precision.

Figure 4:
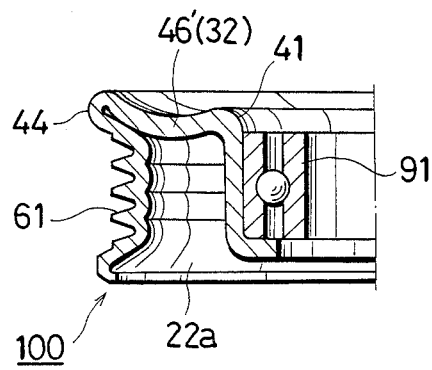
FIGS. 4 to 7 to are partially cut-away sectional views showing other embodiments of this invention.

Incidentally, the bent part is not limited to the sectional shape shown in the embodiment, but it may be, for example as shown in FIG. 4, a bent part 46' moderately bulging in a concave form to the opening 22a side.

Similarly, the formation of the bent part is not limited to this embodiment in which it is once projected outward to the opposite side of the opening 22a side, and is then drawn reversely to bulge out in a convex form at the opening 22a side. Instead, for example, it may be bulged out to the opening 22a side from the beginning.

Figure 5:
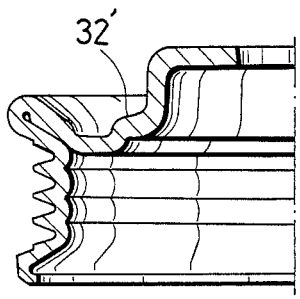

The sheet metal poly-V pulley of this invention is not limited to the sheet metal poly-V pulley having the bearing as shown in this embodiment, but this invention may be similarly applied to a sheet metal poly-V pulley without bearing or a sheet metal poly-V pulley having a stepped bottom wall 32' as shown in FIG. 5.

Figure 6:
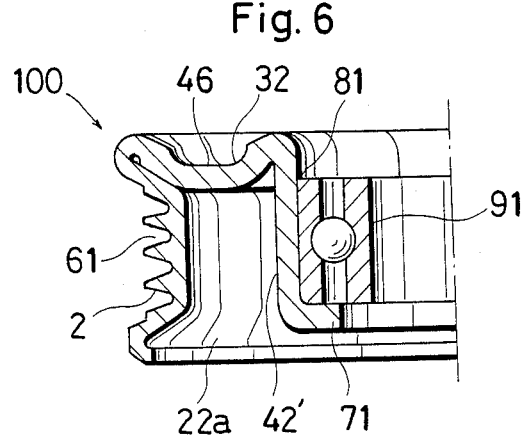
Figure 7:
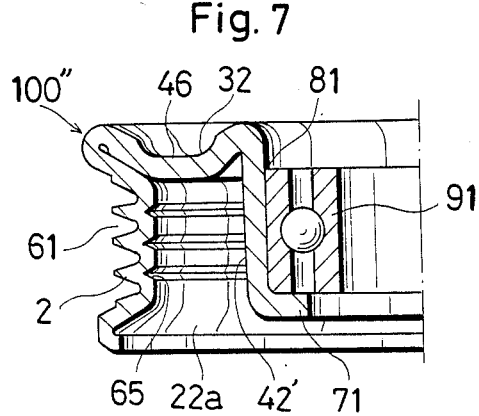

Furthermore, as the sheet metal poly-V pulleys to which this invention may be applied, a flat sheet metal poly-V pulley 100' not possessing grooves (or concave parts) in the inner side of the peripheral wall as shown in FIG. 6, or a sheet metal poly-V pulley 100'' having V-shaped annular inner grooves 65 smaller than poly-V grooves 61 on the outer surface, positioned at the position corresponding to the apex of the partition wall of said poly-V grooves 61, in the inner side of the peripheral wall 2 as shown in FIG. 7 may be naturally acceptable.

What is claimed is:

1. A sheet metal poly-V pulley adapted for rotation about an axis and having an annular bottom wall with a peripheral edge, a tubular peripheral wall integrally formed from the peripheral edge of the bottom wall and defining and open side of the peripheral wall opposite the bottom wall, and poly-V grooves formed in the peripheral wall, the poly-V pulley comprising:

a bearing fitting part having: a cylindrical portion projecting concentrically with the axis from the base wall toward the opening and terminating in an edge portion; and, an annular flange formed integrally with the cylindrical portion and projecting inwardly from the edge portion; and, an annular bent part of the bottom wall, between the peripheral edge and the cylindrical portion, having a cross-section substantially throughout defining a convex surface facing the opening.

2. The pulley of claim 1, further comprising a bearing assembly disposed in the bearing fitting part.

3. The pulley of claim 2, wherein the bearing assembly is retained in the bearing fitting part by a crimp in the cylindrical portion.

* * * * *